(12) United States Patent
Chen et al.

(10) Patent No.: US 8,162,527 B2
(45) Date of Patent: Apr. 24, 2012

(54) BACKLIGHT MODULE AND THE METHOD FOR MANUFACTURING THE SAME

(75) Inventors: Chun-Yuan Chen, Hsin-Chu (TW); Hsu-Sheng Hsu, Hsin-Chu (TW); Chih-Wei Chen, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 0 days.

(21) Appl. No.: 12/910,898

(22) Filed: Oct. 25, 2010

(65) Prior Publication Data

US 2011/0037182 A1 Feb. 17, 2011

Related U.S. Application Data

(62) Division of application No. 12/136,302, filed on Jun. 10, 2008, now Pat. No. 7,841,761.

(30) Foreign Application Priority Data

Jun. 27, 2007 (TW) ................................ 96123209 A

(51) Int. Cl.
*F21V 7/04* (2006.01)
(52) U.S. Cl. ............ 362/633; 362/97.1; 349/58; 264/1.7
(58) Field of Classification Search .......... 362/632–634, 362/97.1–97.4, 225, 559–561, 375, 362; 349/58–60; 264/261, 1.7, 259, 339
See application file for complete search history.

(56) References Cited

U.S. PATENT DOCUMENTS

| | | | | |
|---|---|---|---|---|
| 7,841,761 B2 * | 11/2010 | Chen et al. | ..................... | 362/633 |
| 2003/0198039 A1 * | 10/2003 | Jeong et al. | ..................... | 362/31 |
| 2007/0046859 A1 * | 3/2007 | Huang et al. | ..................... | 349/65 |
| 2007/0047265 A1 | 3/2007 | Kang et al. | | |
| 2007/0053177 A1 | 3/2007 | Choi et al. | | |
| 2007/0120878 A1 | 5/2007 | Hsiao et al. | | |
| 2008/0297681 A1 * | 12/2008 | Yang et al. | ..................... | 349/58 |
| 2008/0303971 A1 * | 12/2008 | Lee et al. | ..................... | 349/58 |

FOREIGN PATENT DOCUMENTS

| | | |
|---|---|---|
| TW | 200606518 | 2/2006 |
| TW | 200613829 | 5/2006 |
| TW | I274919 | 3/2007 |
| TW | M307131 | 3/2007 |
| TW | 200736579 | 10/2007 |

OTHER PUBLICATIONS

English translation of abstract of TW I274919.
English translation of abstract of TW M307131.
English translation of abstract of TW 200736579.
English translation of abstract of TW 200606518.
English translation of abstract of TW 200613829.
Taiwan Office Action dated Oct. 28, 2011.

* cited by examiner

*Primary Examiner* — Bao Q Truong
(74) *Attorney, Agent, or Firm* — Thomas, Kayden, Horstemeyer & Risley, LLP

(57) ABSTRACT

A backlight module and a manufacture method thereof are provided. The backlight module includes a frame body and an optical plate. The frame body includes a first material frame and a second material frame, and the second material frame is embedded in the first material frame and the strength of the second material frame is higher than that of the first material frame. The first material frame enwraps part of the second material frame to form at least one connection part, and the optical plate is disposed in the frame body and is connected with at least one connection part.

13 Claims, 12 Drawing Sheets

BACKLIGHT MODULE AND THE METHOD FOR MANUFACTURING THE SAME

This application is a divisional of U.S. application Ser. No. 12/136,302 filed Jun. 10, 2008, now U.S. Pat. No. 7,841,761, which claims the benefit from the priority of Taiwan Patent Application No. 096123209 filed on Jun. 27, 2007, the disclosures of which are incorporated by reference herein in their entirety.

BACKGROUND OF THE INVENTION

1. Field of the Invention

The present invention relates generally to a backlight module and the manufacture method thereof; particularly, the present invention relates to a backlight module which may be used to enhance the integral strength of the display panel.

2. Description of the Related Art

The progress of the electronic display device technology fulfills various needs of mankind in the modern society. Electronic display devices are widely used in products such as personal electronic devices, personal computers (PCs) monitors and household electronic appliances and have become increasingly important in our daily life. Furthermore, as the trend of modern electronic products is aiming for thinner and smaller electronic products, the electronic display devices are designed and manufactured to be thinner.

Generally, the overmolding process is widely used to integrate the frame body and the optical plate into a display panel with enhanced integral strength. As FIG. 1 shows, the lateral sides of the optical plate 60 are uneven and also not provided with a reflector. Thus an uneven surface tends to occur between the optical plate 60 and the frame body 30, which may further decrease the brightness of the display panel. In addition, due to the fact that frame body 30 and optical plate 60 are made of different materials, the integral strength of the display panel will be less stable if its integral strength depends solely on the performance of the injection molding process. Furthermore, sometimes the strength of the optical plate 60 and that of the frame body 30 created by overmolding process is insufficient according to the requirement for thinner electronic products. Thus it can be seen that the above-mentioned facts are unfavorable for manufacturing thinner display panels.

SUMMARY OF THE INVENTION

It is an objective of the present invention to provide a backlight module formed by integrating an optical plate with a frame body which includes at least one material frame. The integrated structure has an enhanced integral strength which also satisfies the demand for thinner display panel.

It is another objective of the present invention to provide a backlight module manufactured by the injection molding process which integrates the optical plate, the first material frame and the second material frame into an integrated structure with enhanced strength.

It is another objective of the present invention to provide a backlight module manufactured by the overmolding process to integrate the frame body and the optical plate by means of a metallic frame to enhance the overall strength as well as the brightness of the display panel.

It is yet another objective of the present invention to provide a method for manufacturing the backlight module using the overmolding process which integrates the optical plate, the metallic frame and the plastic frame into an integrated structure which also shortens the assembly time and further decrease the cost of assembly.

The present invention of the backlight module includes a frame body and an optical plate. The frame body includes a first material frame and a second material frame, wherein the second material frame is embedded in the first material frame and the strength of the second material frame is higher than that of the first material frame.

The first material frame mentioned above enwraps part of a bottom surface and part of a top surface of the second material frame to forms at least one connection part, wherein the optical plate is disposed within the frame body and is connected to at least one connection part.

The second material frame mentioned above may further include a plurality of convex parts formed by bending, wherein at least one of the convex parts include a cap part; the cap part and the first material frame together form at least one connection part to be connected to the optical plate.

In addition, the structure of above-mentioned second material frame may be designed differently in accordance with the required strength for different products.

The present invention also provides a method for manufacturing the backlight module which includes firstly disposing a second material frame in a frame mold to form a frame body, forming the first material frame as well as an optical plate in the frame mold by injection molding and integrating the optical plate, the first material frame and the second material frame into an integrated backlight module wherein the strength of the second material frame is higher than that of the first material frame.

DETAILED DESCRIPTION OF THE PREFERRED EMBODIMENT

The present invention provides a backlight module and the manufacture method thereof. The optical plate is integrated with frame body of at least one material frame into an integrated structure to increase the overall strength of the display panel and to satisfy the demand for thinner display panels. The backlight module of the present invention preferably adopts the injection molding process to integrate an optical plate, a first material frame and a second material frame into an integrated structure with an enhanced strength. In a more preferred embodiment, the overmolding process is adopted to process the backlight module of the present invention and to enhance the overall strength of the display panel. A metallic frame is coupled with a plastic frame and an optical plate (such as a light guide or a film) to maintain the even brightness of the display panel. The backlight module of the present invention is preferred to be applied in electronic products such as mobile display devices, the handheld display devices or display devices used in the vehicle. However, in another embodiment, the backlight module of the present invention may be applied in PC (Personal Computer) displays with various sizes, household appliance displays or other display panels and devices which require high strength in their structures.

Figure 1:
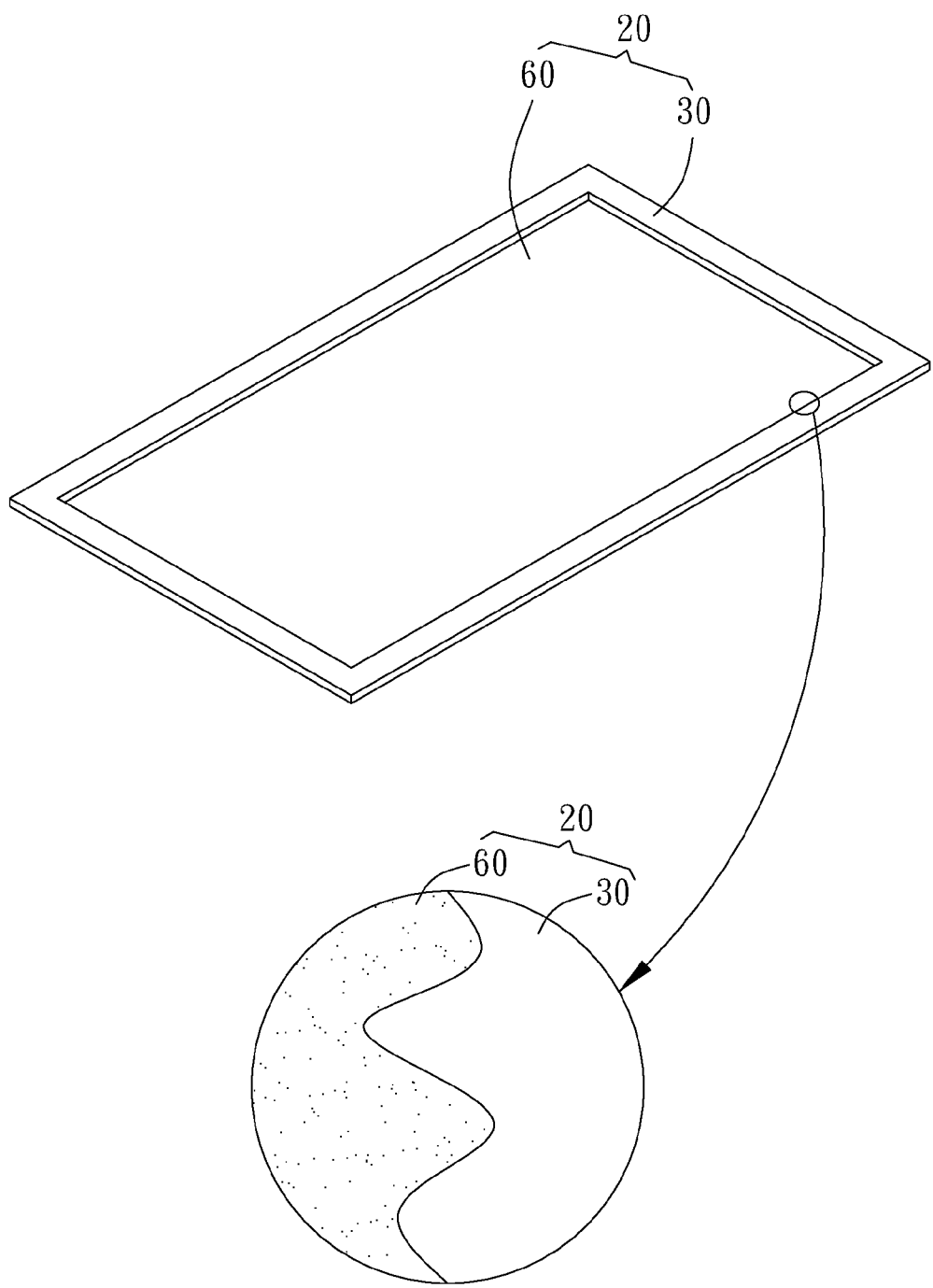
FIG. 1 illustrates the structure of a conventional backlight module.
Figure 2:
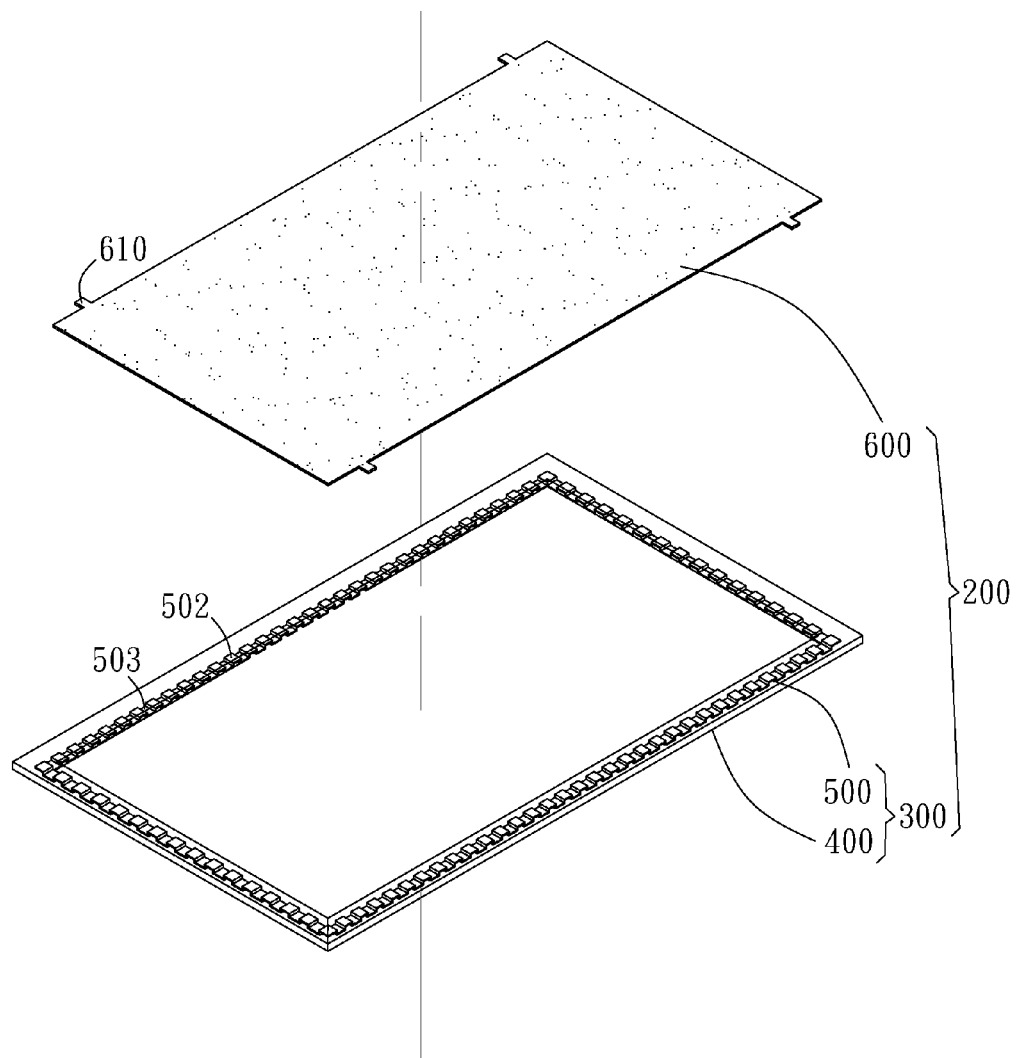
FIG. 2 is an exploded diagram of a preferred embodiment of the backlight module of the present invention.
Figure 3:
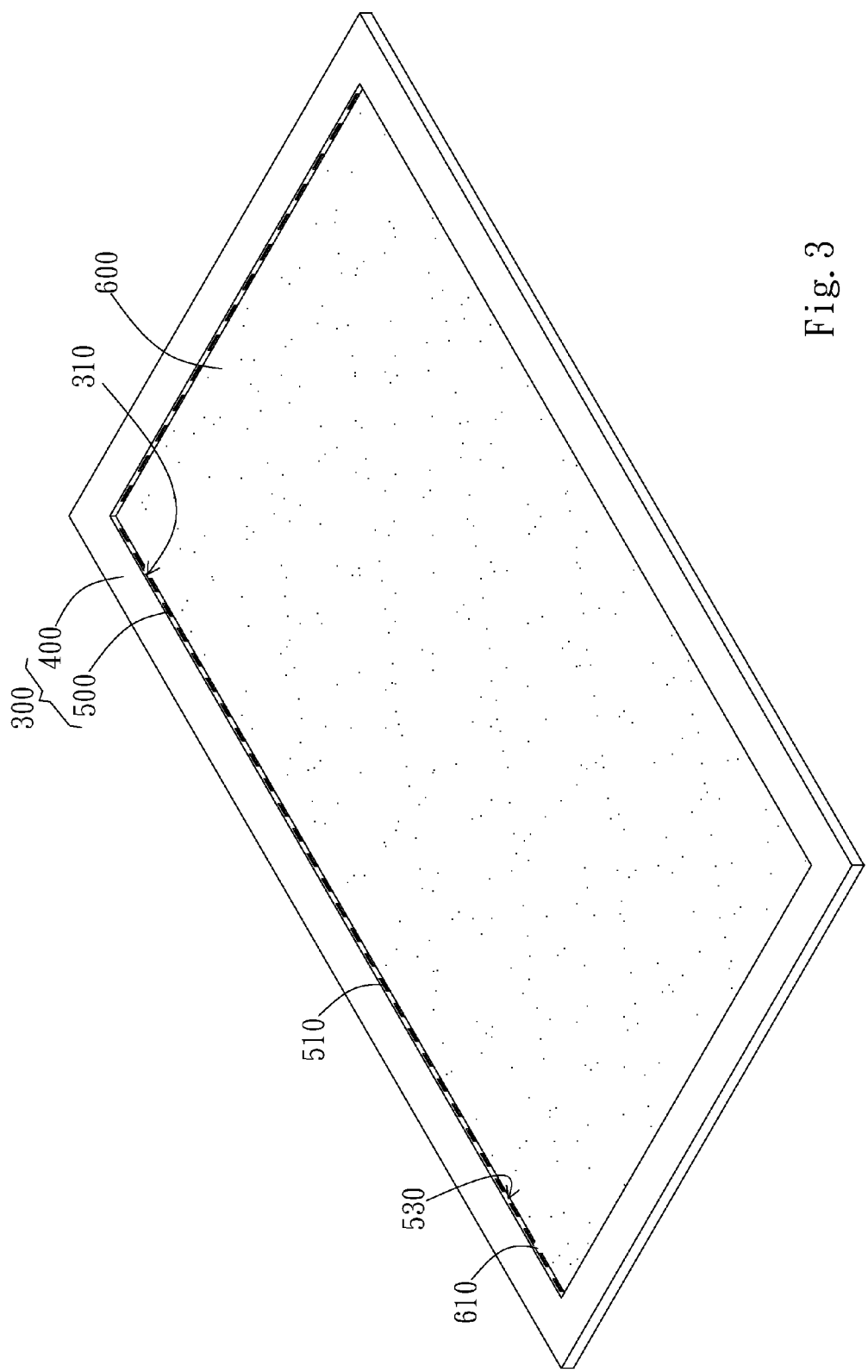
FIG. 3 illustrates an assembly diagram of the preferred embodiment of the backlight module of the present invention.

FIG. 2 illustrates a preferred embodiment of the backlight module of the present invention. As FIG. 2 and FIG. 3 show, the backlight module 200 of the present invention includes a frame body 300 and an optical plate 600. The frame body 300 includes a first material frame 400 made of a first material and a second material frame 500 made of a second material, wherein the second material frame 500 is embedded in the first material frame 400. The strength of the second material frame 500 is higher than that of the first material frame 400. The expression, "the strength of the second material frame is higher than that of the first material frame", mentioned above indicates that the first material and the second material and different and have their own melting points, rigidities or hardness. The melting point, rigidity and hardness of the second material are higher than those of the first material. As for the preferred embodiment illustrated in FIG. 2 and FIG. 3, the first material is preferred to include thermoplastic material such as plastic which is provided as first material frame 400 to form plastic frame 401 through injection molding process. The second material is preferred to include the material with high melting point and high rigidity or hardness such as metal or alloy. The second material is used to form second material frame 500 (which is a metallic frame 501) through bending or stamping. However in another embodiment, the second material may include other materials such as the ceramics or polymer which has higher strength compared with the plastic material.

As shown in FIGS. 2 and 3, the first material frame 400 and the second material frame 500 together form at least one connection part 310 provided for the optical plate 600 to be disposed in the frame body 300. As FIG. 2 and FIG. 3 show, the first material frame 400 is preferred to enwrap part of a bottom surface 502 and part of a top surface 503 of the second material frame 500 to form at least one connection part 310. The optical plate 600 is disposed within the frame body 300 and is connected to at least one connection part 310. As for the preferred embodiment illustrated in FIG. 2 and FIG. 3, at least one connection part 310 is preferred to include a concave connecting hole and is selectively disposed at the inside edge of the frame body 300 to be connected with the optical plate 600. In this preferred embodiment, an edge of the optical plate 600 includes at least one connection ear 610 provided to engage at least one of the connection parts 310, wherein the edge of the optical plate 600 would engage the inner edge of the frame body 300. As FIG. 2 and FIG. 3 show, the optical plate 600 is preferred to be coupled with the first material frame 400 through the overmolding process to form an integrated structure. However in another embodiment, the overmolding process is adopted to integrate the second material frame 500 with the first material frame 400 into a semi-finished backlight module. The semi-finished backlight module is then integrated with the optical plate 600 through injection molding process to form a backlight module 200.

Figure 4A:
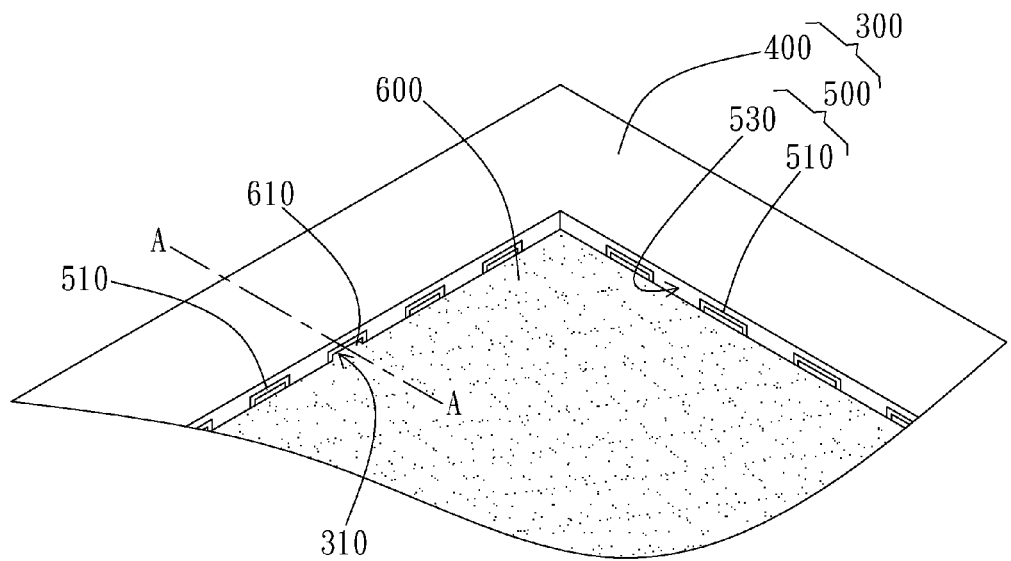
FIG. 4a illustrates a sectional view (A-A cross-section) of the preferred embodiment of the present invention illustrated in FIG. 3.
Figure 4A:
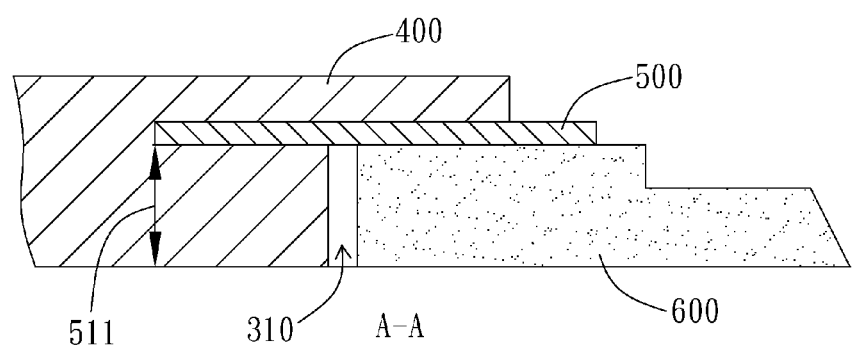
Figure 4B:
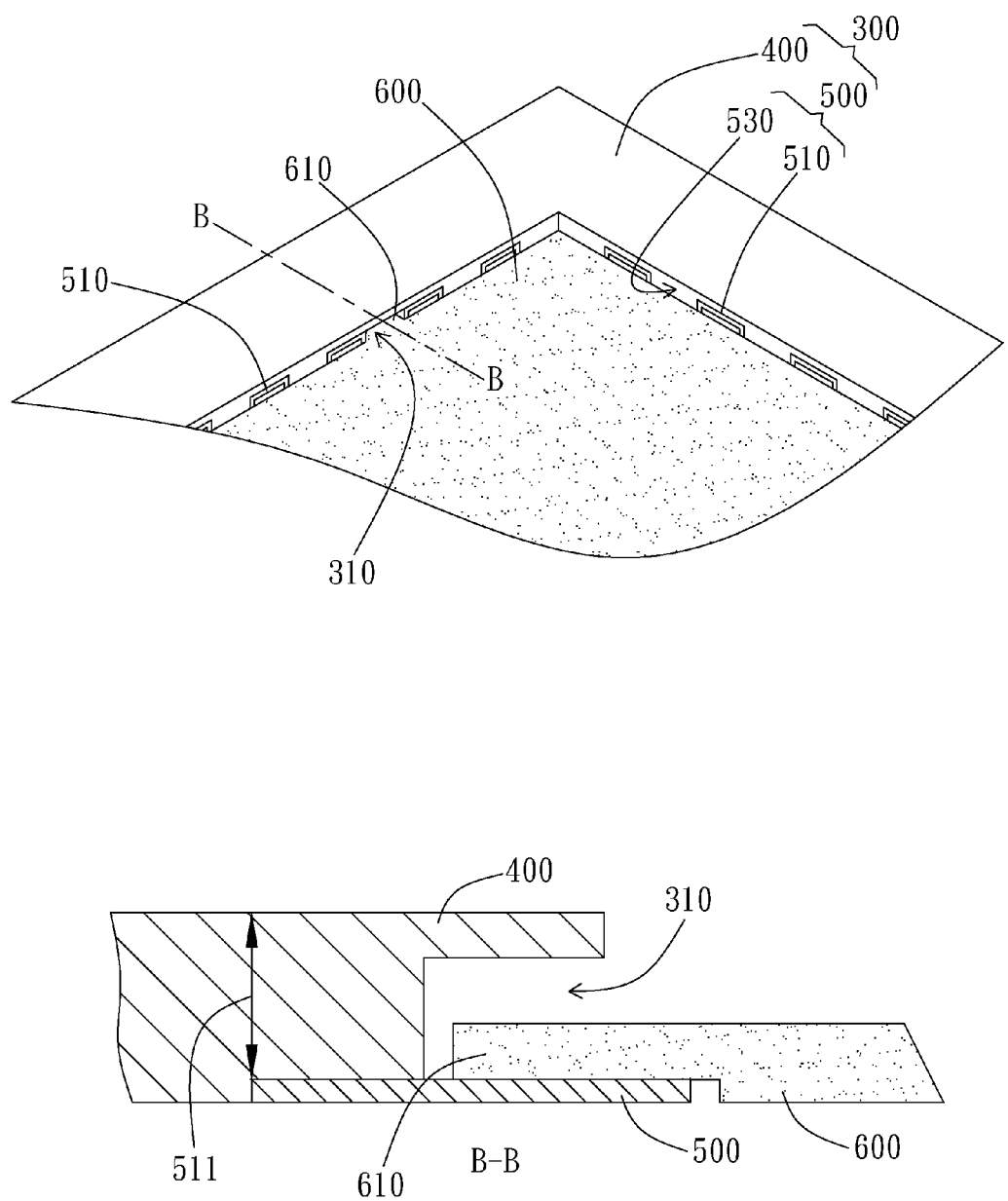
FIG. 4b illustrates a sectional view (B-B cross-section) of the preferred embodiment of the present invention illustrated in FIG. 3.

As FIG. 3 shows, the second material frame 500 is preferred to further include a plurality of convex parts 510 formed by bending, wherein the convex parts 510 are connected sequentially to form the second material frame 500. As FIG. 3 and FIG. 4a show, at least one of those convex parts 510 has a cap part 511, the cap part 511 and the first material frame 400 together form at least one connection part 310 to be connected to at least one connection ear 610 of the optical plate 600. As for the sectional view of the embodiment illustrated in FIG. 4a, the second material frame 500 is preferred to be disposed beneath the first material frame 400, wherein the first material frame 400 enwraps part of the second material frame 500 to form at least one connection part 310 which is provided for the optical plate 600 to be disposed within the second material frame 500. As FIG. 3 and FIG. 4b show, the second material frame 500 is preferred to include at least one concave part 530 disposed between two adjacent convex parts 510. At least one of the concave parts 530 and the two adjacent convex parts 510 are connected with each other sequentially to form the second material frame 500. In the preferred embodiment shown in FIG. 4b, at least one concave part 530 and the first material frame 400 together form at least one connection part 310 to be connected with at least one connection ear 610 of the optical plate 600. In the sectional view of the embodiment illustrated in FIG. 4b, the first material frame 400 is formed above at least one of the concave parts 530 and enwraps two adjacent convex parts 510 of the second material frame 500 to form at least one connection part 310. The connection part 310 is provided for optical plate 600 to be disposed between the first material frame 400 and the second material frame 500. Thus, as FIG. 4b shows, the optical plate 600 is disposed above the second material frame 500 and beneath the first material frame 400.

Figure 5A:
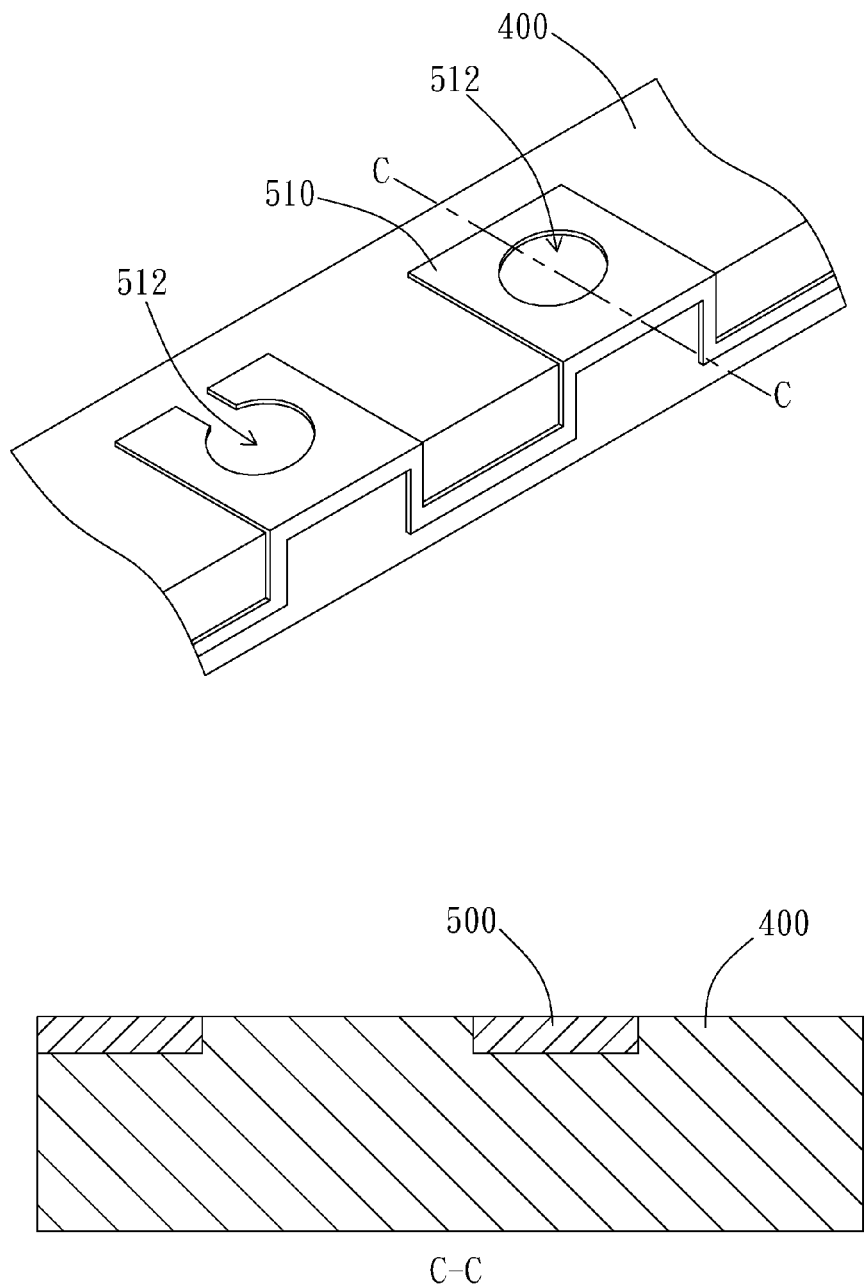
FIG. 5a illustrates the structure of the second material frame of the backlight module in another preferred embodiment of the present invention.
Figure 5B:
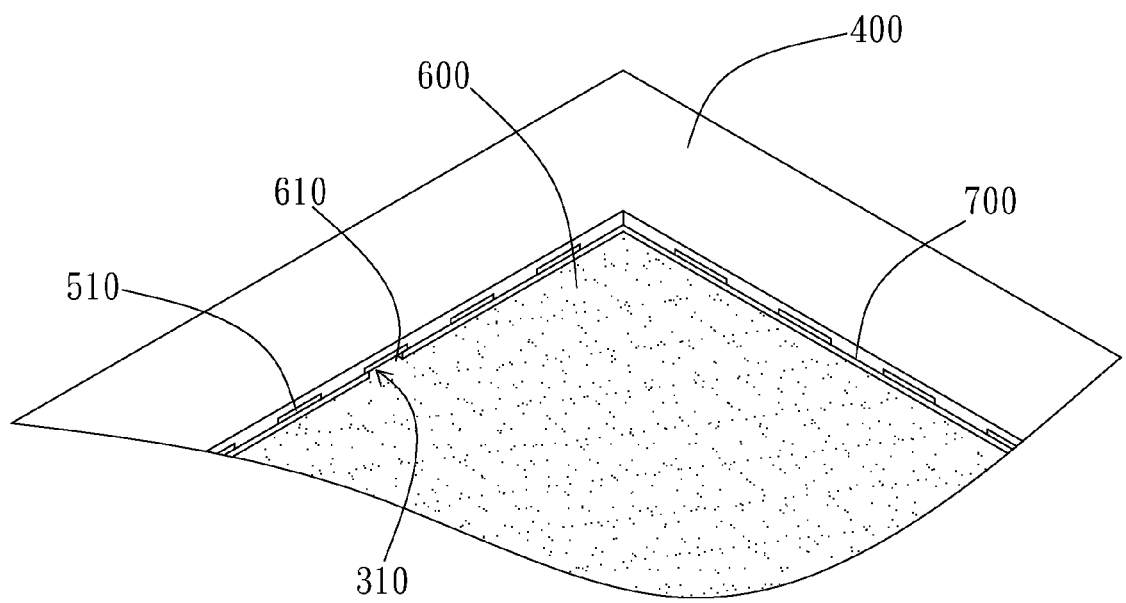
FIG. 5b illustrates another preferred embodiment of the backlight module of the present invention.

As for the preferred embodiment shown in FIG. 5a, the convex part 510 further includes a positioning aperture 512, wherein part of the first material frame 400 is accommodated in the positioning aperture 512. As FIG. 5a shows, the positioning aperture 512 has a cross-section in circular shape and a keyhole shape. However in another embodiment, the positioning aperture 512 may have a cross-section in square shape or other shapes which will strengthen the connection between the first material frame 400 and the second material frame 500. In addition, as FIG. 5b shows, the backlight module 200 of the present invention is preferred to further include a reflector 700 disposed at the lateral side of the optical plate 600, wherein the reflector 700 makes contact with the second material frame 500 and maintains the brightness of the display panel.

Figure 6A:
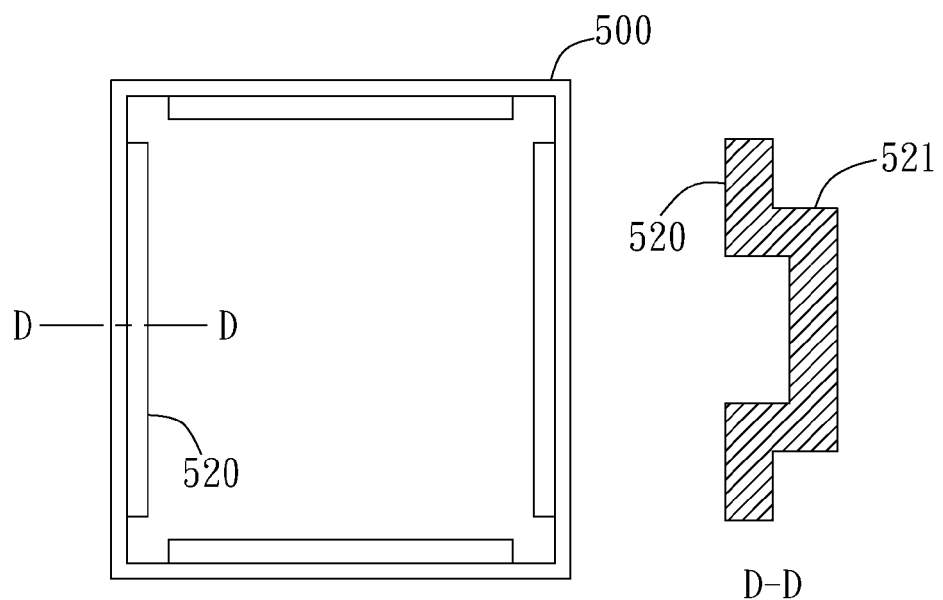
FIG. 6a illustrates the structure of the second material frame of the backlight module in yet another preferred embodiment of the present invention.
Figure 6B:
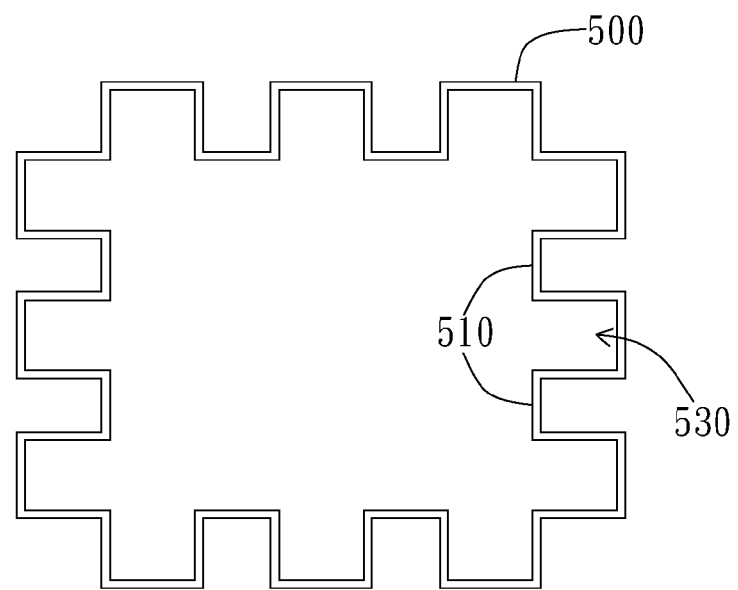
FIG. 6b illustrates yet another structure of the second material frame of the backlight module in another preferred embodiment of the present invention.

In response to strength requirement for different display panels, the second material frame 500 may be designed to have different structures. As for the preferred embodiment shown in FIG. 6a, the second material frame 500 further includes a lateral wall 520. Part of the bottom end of the lateral wall 520 expands inwards to form a toe part 521 which gives the frame body 300 higher loading strength in the lateral direction. In the embodiment illustrated in FIG. 6b, the convex parts 510 and at least one concave part 530 are formed by repeatedly bending the second material frame towards and away from the frame body 300. As FIG. 6b shows, the second material frame 500 is preferred to form a symmetrical and bilateral structure by repeatedly bending the second material frame 500 inward and outward along the axial direction, which would give the frame body 300 higher loading strength in the axial direction.

Figure 7A:
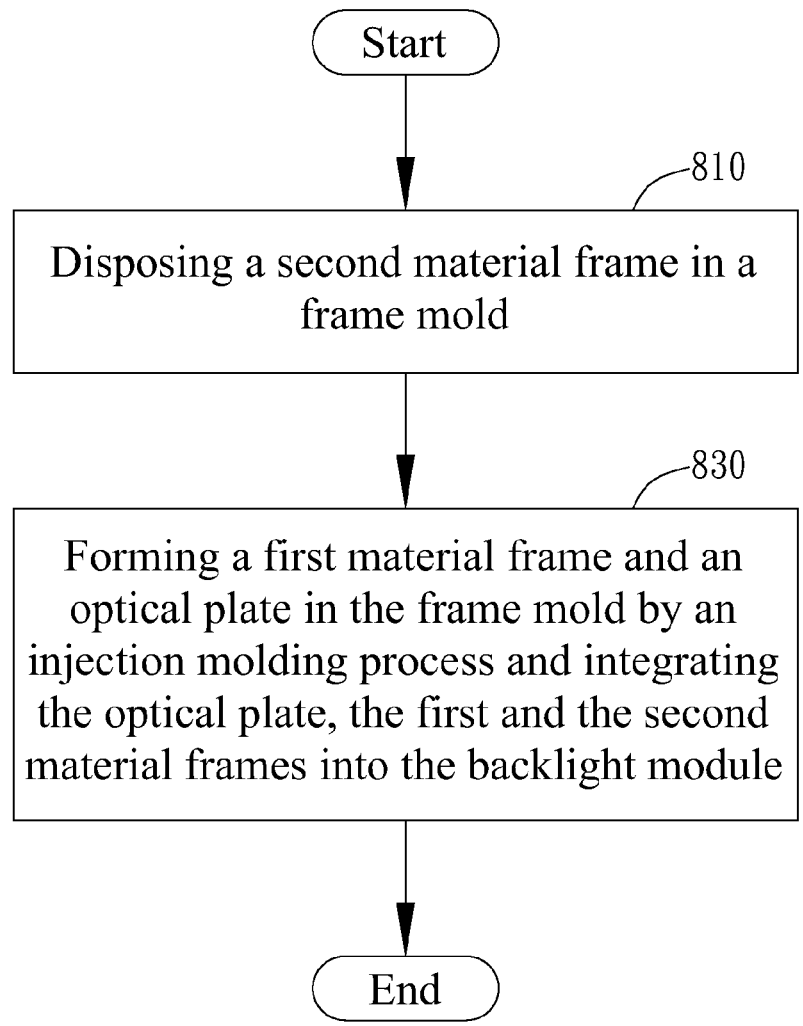
FIG. 7a illustrates a flow chart of a preferred embodiment of the method for manufacturing the backlight module.

The present invention also provides a method to manufacture the backlight module of the present invention. The manufacture method of the present invention will shorten the assembly time and further reduce the cost for assembly. As FIG. 7a shows, the embodiment of the method for manufacturing the backlight module includes step 810 of disposing a second material frame in a frame mold. The step 810 is preferred to dispose material such as alloy or metal material in the frame mold for forming the frame body. However, in another embodiment, it is also preferred to dispose ceramics or polymer which has relatively higher strength.

Next, the manufacture method proceeds with step 830 of forming the first material frame and the optical plate in the frame mold by injection molding process. The first material frame, second material frame and optical plate then are integrated into the backlight module, and the strength of the second material frame is higher than that of the first material frame. In the preferred embodiment, step 830 is preferred to include attaching a reflector at the lateral side of the optical plate adjacent to the second material frame. In the preferred embodiment, the above-mentioned injection molding process further includes forming a positioning aperture in the second material frame, which allows part of the melted first material frame to fill into the positioning aperture and then solidifies. In the flow chart shown in FIG. 7a, the injection molding process mentioned in step 830 includes filling the melted thermoplastic material such as plastic into the frame mold and forming the plastic frame which enwraps the second material frame and the optical plate to form an integrated structure after the thermoplastic material solidifies. Furthermore, the preferred embodiment of the above-mentioned optical plate forming step and the first material frame forming step both include employing the overmolding process to form the frame body.

Figure 7B:
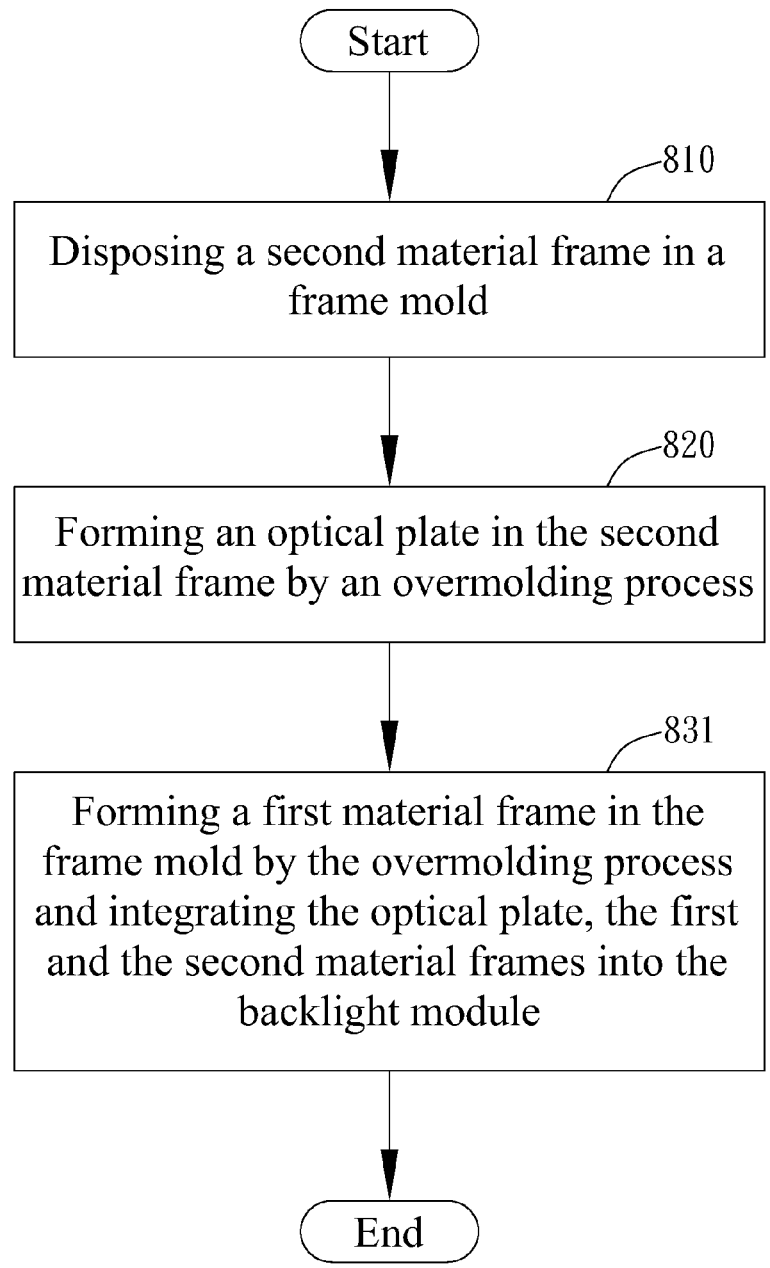
FIG. 7b illustrates a flow chart of another preferred embodiment of the method for manufacturing the backlight module.

FIG. 7b shows another preferred embodiment of the method of the present invention to manufacture the backlight module. In the flow chart shown in FIG. 7b, the method of the present invention to manufacture the backlight module includes firstly the step 810 of disposing the second material frame in the frame mold. The preferred embodiment of the second material frame disposing step includes disposing the second material frame made of alloy or metal in the frame mold. However in other embodiments, it is also preferred to dispose the second material frame made of other material such as the ceramics or polymer which has relatively higher strength.

The step 820 includes forming the optical plate in the second material frame by overmolding process. The preferred embodiment of the optical plate forming step further includes attaching a reflector at the lateral side of the optical plate adjacent to the second material frame. Lastly, the step 831 includes forming the first material frame in the frame mold and forming the frame body by overmolding process so that the optical plate and both of the first and the second material frames are molded integrally to form the backlight module, wherein the strength of the second material frame is higher than that of the first material frame. The preferred embodiment of the above-mentioned injection molding process further includes disposing the melted second material frame in a positioning aperture after the melted first material frame solidifies. In the flow chart shown in FIG. 7b, the injection molding process mentioned in step 831 includes filling the melted thermoplastic material such as plastic into the frame mold and forming the plastic frame which enwraps the second material frame and the optical plate as a whole to form an integrated structure after the melted thermoplastic material solidifies. Furthermore, the preferred embodiment of the above optical plate forming step and the first material frame forming step both include using the overmolding process to form the frame body.

Figure 7C:
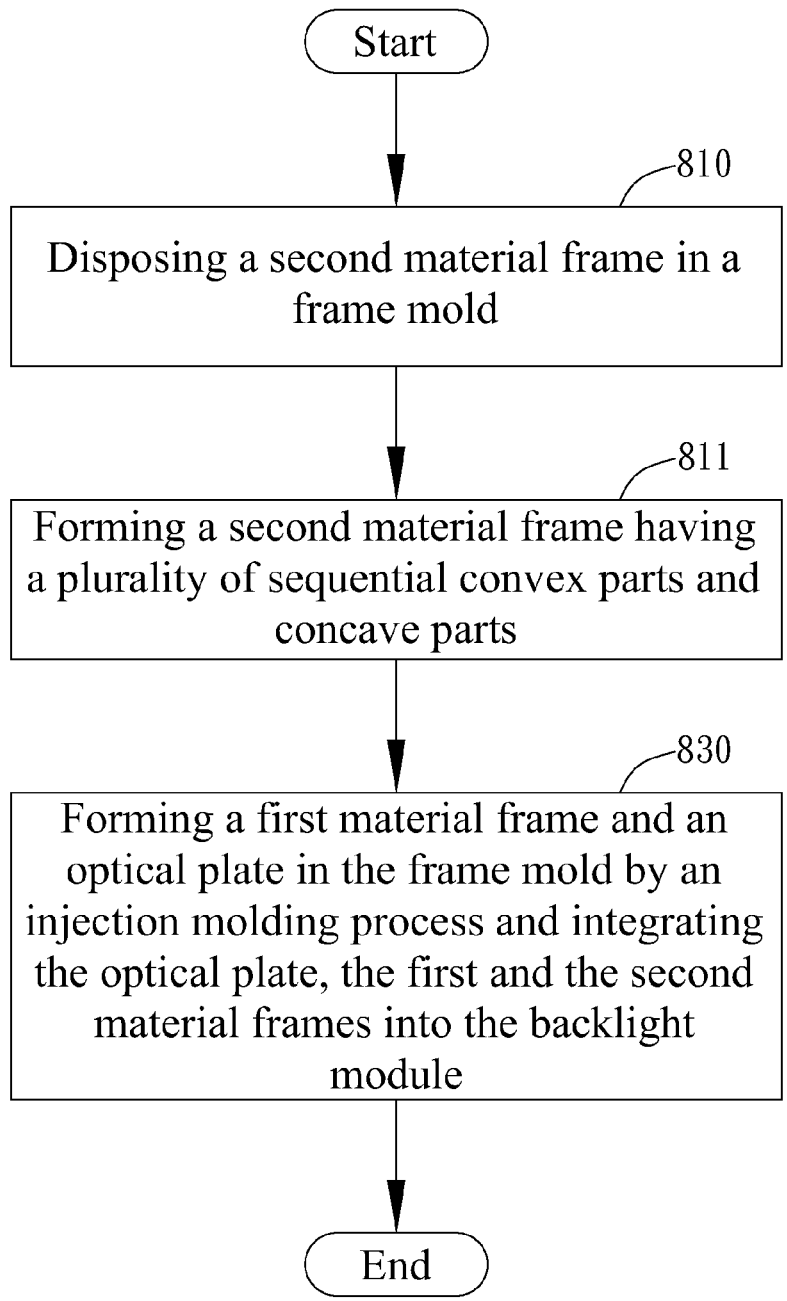
FIG. 7c illustrates a flow chart of yet another preferred embodiment of the method for manufacturing the backlight module.
Figure 7D:
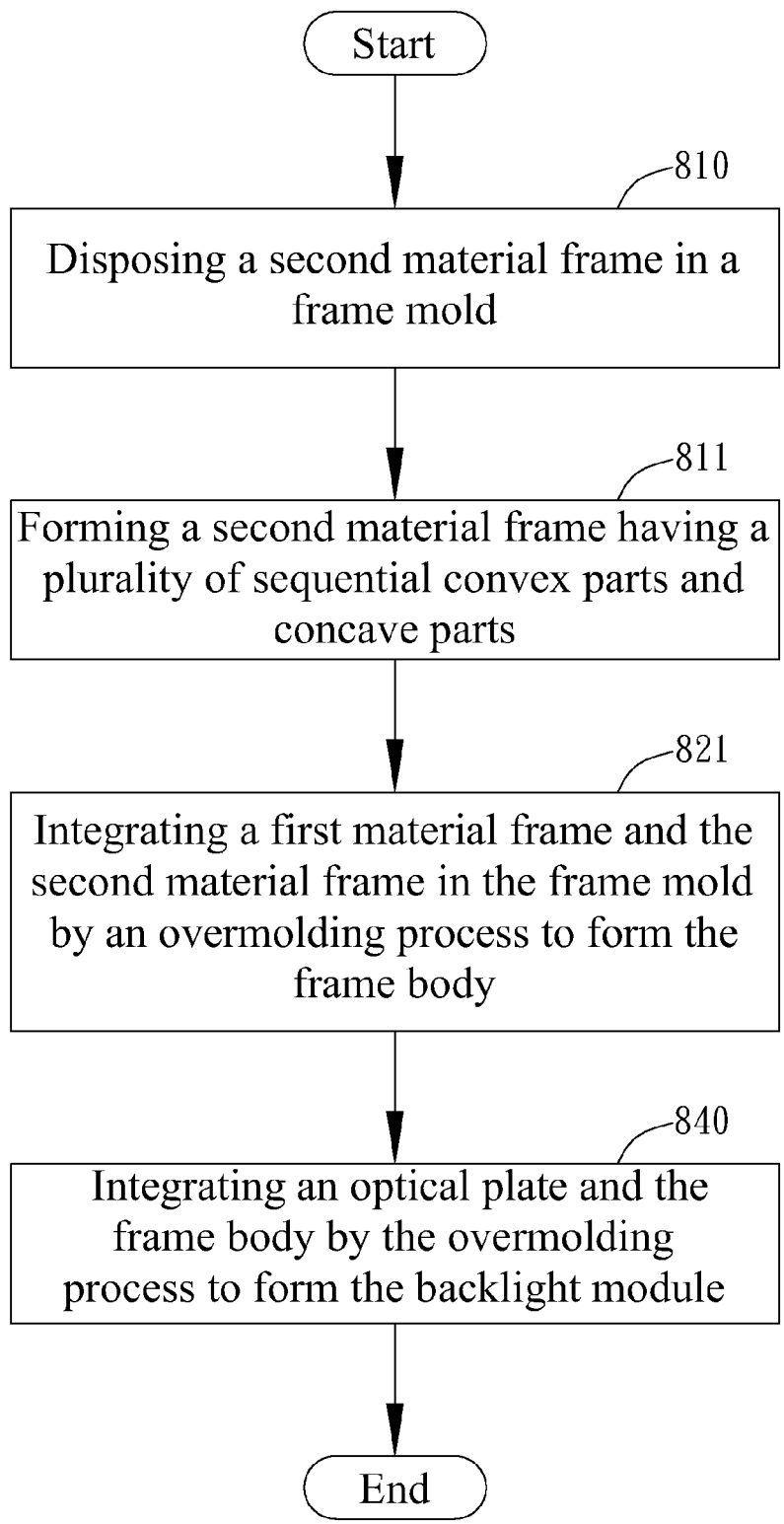
FIG. 7d illustrates a flow chart of yet another preferred embodiment of the method for manufacturing the backlight module.

As FIG. 7c shows, step 810 further includes step 811 of forming a second material frame which includes a plurality of convex parts and concave parts disposed sequentially. In a preferred embodiment, it is preferred to form convex parts and concave parts by repeatedly bending the second material frame in one direction and then the other. However, in another embodiment, the convex parts and concave parts are also preferred to be formed by stamping as well. Furthermore, in other embodiments, it is also preferred to perform the step 821 after the step 810 and step 811 are finished, i.e. integrating the first material frame and the second material frame in the frame mold by overmolding process to form the frame body. As shown in FIG. 7d, the above-mentioned frame body forming step includes integrating at least one convex part with the first material frame to form at least one connection part which is provided for coupling the optical plate with the frame body. However in another embodiment, the above-mentioned frame body forming step includes disposing at least one concave part between two adjacent convex parts. The frame body forming step also includes disposing at least one of the concave parts to couple with the first material frame to form at least one connection part, which is provided for the optical plate to be disposed in the frame body. The above-mentioned optical plate forming step further includes disposing at least one connecting ear at the optical plate by injection molding, wherein at least one connecting ear is connected to at least one connection part so that the optical plate is disposed in the frame body. Lastly, the step 840 includes integrating the optical plate with the frame body by overmolding process to form the backlight module of the present invention.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A method for manufacturing a backlight module, comprising:
   disposing a second material frame in a frame mold;
   forming a first material frame and an optical plate in the frame mold through an injection molding process and integrating the optical plate, the first material frame and the second material frame, wherein the strength of the second material frame is greater than the strength of the first material frame, the second material frame is embedded in the first material frame; and
   forming at least one connection part with the first material frame and the second material frame to connect with the optical plate.

2. The method of claim 1, further comprising:
integrating the first material frame and the second material frame in the frame mold to form a frame body by an overmolding process; and
integrating the optical plate and the frame body to form the backlight module by the overmolding process.

3. The method of claim 1, further comprising:
disposing the second material frame in the frame mold;
forming the optical plate within the second material frame by overmolding process; and
forming the first material frame in the frame mold by the overmolding process so that the optical plate, the first material frame and the second material frame are integrated into the backlight module.

4. The method of claim 1 further comprising attaching a reflector at the lateral side of the optical plate adjacent to the second material frame.

5. The method of claim 1, wherein the first material frame includes a thermal plastic material.

6. The method of claim 1, wherein the second material frame includes a metallic material.

7. The method of claim 1, further comprising forming the second material frame having a plurality of convex parts and concave parts disposed sequentially.

8. The method of claim 7, wherein the convex parts and concave parts are formed by bending.

9. The method of claim 7, wherein the convex parts and concave parts are formed by stamping.

10. The method of claim 7, wherein the first material frame and at least one of the convex parts form at least one connection part, and the connection part is provided for the optical plate to be disposed in the frame body.

11. The method of claim 7, wherein at least one of the concave parts is disposed between two adjacent convex parts, at least one of the concave parts couples with the first material frame to form at least one connection part, and the connection part is provided for the optical plate to be disposed in the frame body.

12. The method of claim 10, further comprising forming a connecting ear on the optical plate by the injection molding process, and the connecting ear is connected to at least one of the connection parts.

13. The method of claim 1, further comprising forming a positioning aperture in the second material frame to accommodate the first material frame after the melted first material frame solidifies.

* * * * *